US00RE40251E

(19) United States
(12) Reissued Patent
Ogawa et al.

(10) Patent Number: US RE40,251 E
(45) Date of Reissued Patent: Apr. 22, 2008

(54) OPTICAL ELEMENT, POLARIZATION ILLUMINATION DEVICE, AND PROJECTOR

(75) Inventors: Yasunori Ogawa, Suwa (JP); Akitaka Yajima, Suwa (JP); Tomiyoshi Ushiyama, Suwa (JP)

(73) Assignee: Seiko Epson Corporation, Tokyo (JP)

(21) Appl. No.: 11/066,243

(22) Filed: Feb. 25, 2005

Related U.S. Patent Documents

Reissue of:
(64) Patent No.: 5,978,136
Issued: Nov. 2, 1999
Appl. No.: 08/992,012
Filed: Dec. 17, 1997

U.S. Applications:
(62) Division of application No. 09/985,390, filed on Nov. 2, 2001.

(30) Foreign Application Priority Data

Dec. 18, 1996 (JP) ..... 8-354364

(51) Int. Cl.
*G02B 5/30* (2006.01)
*G02B 27/28* (2006.01)

(52) U.S. Cl. ..... 359/487; 359/495; 359/497; 359/627

(58) Field of Classification Search ..... 359/487, 359/495, 619, 622, 626, 627; 353/20, 497
See application file for complete search history.

(56) References Cited

U.S. PATENT DOCUMENTS

| | | | |
|---|---|---|---|
| 2,748,659 | A | 6/1956 | Geffcken et al. |
| 2,821,114 | A | 1/1958 | Wiemer et al. |
| 5,096,520 | A | 3/1992 | Faris |

(Continued)

FOREIGN PATENT DOCUMENTS

| | | |
|---|---|---|
| EP | 0 359 658 A2 | 9/1989 |
| EP | 0 422 661 A2 | 4/1991 |
| EP | 508 413 | 10/1992 |
| EP | 584 802 | 3/1994 |
| GB | 2 153 546 A | 8/1985 |

(Continued)

OTHER PUBLICATIONS

Patent Abstracts of Japan, JP 07 29406 A, Nov. 10, 1995.

Yoneno, Kunio et al., "High Definition Front Projector Using Poly–Si TFT LCD", Conference Record of the 1991 International Display Research Conference, Oct. 15, 1991, pp. 147–150, XP000314344, Abstract, Figure 1.

*Primary Examiner*—Ricky D. Shafer
(74) *Attorney, Agent, or Firm*—Oliff & Berridge, PLC

(57) ABSTRACT

Two polarization conversion element arrays are disclosed. Each polarization conversion element array is composed of a plurality of polarization conversion elements for converting light incident upon the polarization conversion element array to a linearly polarized light beam with a predetermined polarization direction. The plurality of polarization conversion elements are disposed opposite to each other with a predetermined space provided between at about the center of the light-outgoing surface of a lens array in the direction of arrangement. Of the light beams (s-polarized+p-polarized light beams) gathered by the lens array, light beam that is not incident upon the polarization conversion element and passes through the predetermined space is a light beam including a predetermined polarized light beam (s-polarized light beam) that is primarily made to leave the array 320a and an ineffective polarized light beam (p-polarized light beam). Of the light passing through and leaving the space, the required polarized light beam alone can be made to leave as an effective light beam by providing a polarization plate or the like at the light-outgoing side of the space.

2 Claims, 11 Drawing Sheets

U.S. PATENT DOCUMENTS

| | | | | |
|---|---|---|---|---|
| 5,283,600 | A | 2/1994 | Imai | |
| 5,381,278 | A | 1/1995 | Shingaki et al. | |
| 5,555,186 | A | 9/1996 | Shioya | |
| 5,566,367 | A | 10/1996 | Mitsutake et al. | |
| 5,626,409 | A | 5/1997 | Nakayama et al. | |
| 5,650,873 | A | 7/1997 | Gal et al. | |
| 5,729,306 | A | 3/1998 | Miyake et al. | |
| 5,751,480 | A | 5/1998 | Kitagishi | |
| 5,764,412 | A | 6/1998 | Suzuki et al. | |
| 5,865,521 | A | 2/1999 | Hashizume et al. | |
| 5,978,136 | A | 11/1999 | Ogawa et al. | |
| 6,067,193 | A | 5/2000 | Sekine et al. | |
| 6,092,901 | A | 7/2000 | Hashizume et al. | |
| 6,147,802 | A | 11/2000 | Itoh et al. | |
| 6,394,607 | B1 * | 5/2002 | Hashizume et al. | 353/31 |
| 6,404,550 | B1 * | 6/2002 | Yajima | 359/487 |
| 6,527,393 | B1 | 3/2003 | Ogawa | |

FOREIGN PATENT DOCUMENTS

| | | |
|---|---|---|
| JP | 54-118855 | 9/1979 |
| JP | 63-182987 | 7/1988 |
| JP | 1-54401 | 3/1989 |
| JP | A-64-54401 | 3/1989 |
| JP | 2-108018 | 4/1990 |
| JP | A-2-167502 | 6/1990 |
| JP | 2-167502 | 6/1990 |
| JP | 3-126910 | 5/1991 |
| JP | 3-197920 | 8/1991 |
| JP | 3-103678 | 10/1991 |
| JP | 3-241311 | 10/1991 |
| JP | 4-13391 | 1/1992 |
| JP | 4-58214 | 2/1992 |
| JP | 5-107505 | 4/1993 |
| JP | A-5-107505 | 4/1993 |
| JP | 5-157995 | 6/1993 |
| JP | A-5-181135 | 7/1993 |
| JP | 5-181135 | 7/1993 |
| JP | A-6-82623 | 3/1994 |
| JP | 06082623 | 3/1994 |
| JP | 6-202063 | 7/1994 |
| JP | 7-5458 | 1/1995 |
| JP | A-7-43508 | 2/1995 |
| JP | 07043508 | 2/1995 |
| JP | 07072428 | 3/1995 |
| JP | 07120753 | 5/1995 |
| JP | 7-225379 | 8/1995 |
| JP | 7-294906 | 11/1995 |
| JP | A-8-114765 | 5/1996 |
| JP | 08114765 | 5/1996 |
| JP | 08221796 | 8/1996 |
| JP | A-8-234182 | 9/1996 |
| JP | 08286152 | 11/1996 |
| JP | A-8-304739 | 11/1996 |
| JP | 09105936 | 4/1997 |
| JP | 09265010 | 10/1997 |
| JP | 09318913 | 12/1997 |
| JP | 10096816 | 4/1998 |

* cited by examiner

OPTICAL ELEMENT, POLARIZATION ILLUMINATION DEVICE, AND PROJECTOR

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,978,136. The reissue applications are application Ser. No. 09/985,390, filed Nov. 2, 2001, the present reissue application, and reissue application Ser. No. 11/403,242, filed Apr. 13, 2006. The present reissue application and application Ser. No. 11/403,242 are divisional applications of application Ser. No. 09/985,390. All three are reissue applications of U.S. Pat. No. 5,978,136.*

BACKGROUND OF THE INVENTION

1. Field of Invention

The present invention relates to an optical element for converting light incident thereto a predetermined polarized light beam, as well as a polarization illumination device and a projection display apparatus using the same.

2. Description of Related Art

In order to increase the efficiency with which light is utilized to provide a bright display, illuminating optical systems of projection display apparatuses make use of a method that converts polarized light with random polarization direction to polarized light with one polarization direction. A known optical element (polarization conversion element) for converting light with random polarization direction to light with one polarization direction is disclosed in Japanese Patent Laid-Open No. 7-294906. FIGS. 14A and 14B are plan views of such an optical element containing a polarization beam splitter array 20 formed by alternately bonding together linear polarization beam splitters 30 including polarization separating flame 36 and linear prisms 40 including reflecting films 46. A lens array composed of a plurality of focus lenses is provided at the light-incoming surface of the polarization beam splitter array 20, with ½ phase plates 24 selectively provided at the light-outgoing surface of the splitter array 20.

As shown in FIG. 14A, light incident upon the lens array 10 is gathered and converted by the lens array 10 into a plurality of separated light beams (or intermediate light beams) that are incident upon the polarization beam splitters 30 disposed in correspondence with the lens array 10 in the form of light beams containing s-polarized components and p-polarized components. The incident light is separated into s-polarized light beams and p-polarized light beams by the polarization separating films 36. Each s-polarized light beam is reflected substantially vertically by its corresponding polarization separating film 36 formed at an angle of 45 degrees with respect to the light-incoming plane. Thus, each s-polarized light beam is reflected again by its corresponding reflecting film 46 formed at an angle of 45 degrees with respect to the light-incoming plane, and leaves its associated prism 40. On the other hand, each p-polarized light beam passes through its corresponding polarization separating film 36, and is converted into an s-polarized light beam by its associated ½ phase plate and leaves it. Thus, this optical element is of the type that converts all of the incident light beams with random polarization direction to be converted into so-polarized light beams before leaving the optical element.

Ideally, all of the light incident upon the lens array 10 and gathered by each of the focus lenses of the lens array 10 should be incident upon the polarization beam splitters disposed in correspondence with each of the focus lenses. As shown in FIG. 14B, however, there are actually portions of the light incident upon the lens array 10 that are not completely gathered by the array 10, causing them to be incident upon their corresponding prisms 40. The light portions incident upon the prisms 40 are totally reflected at their corresponding reflecting films 46, and strike the polarization beam splitters 30 adjacent thereto. The light incident upon the polarization beam splitters 30 is separated into s-polarized light beams and p-polarized light beams by the polarization separating films 36. The s-polarized light beams produced by the separation are reflected by their respective polarization separating films 36, and are converted into p-polarized light beams by their respective ½ phase plates and leave them. On the other hand, the p-polarized light beams pass through their respective polarization separating films 36, and are reflected by and leave the reflecting films 46 disposed in the direction of passage of the light beams. Thus, some of the light incident upon the optical element (polarized conversion element) leaves the optical element as s-polarized light beams, and some of the light incident upon the optical element leaves the optical element as p-polarized light beams. Here, the light-incoming surface of the polarization conversion element can be divided into effective light-incoming areas EA and ineffective light-incoming areas UA. The effective light-incoming areas EA are areas of the light-incoming surface of the polarization conversion element where the incident light beams are converted into the desired polarized light beams and leave the polarization conversion element. On the other hand, the ineffective light-incoming areas UA are areas of the light-incoming surface of the polarization conversion element where the incident light beams leave the polarization conversion element after being converted into undesired polarized light beams.

When there is a desire to use only one type of polarized light beam, it is necessary to cut off the light beams travelling toward the ineffective light-incoming areas UA using a polarization plate or the like. In this case, the aforementioned outgoing p-polarized light beams are not used, thereby reducing the efficiency with which light is used.

SUMMARY OF THE INVENTION

Accordingly, in view of the above-described prior art problem, it is an object of the present invention to provide a technique permitting more efficient use of light of an optical element used in a polarization illumination device or a projection display apparatus.

According to a first aspect of the present invention, there is provided as optical element containing two polarization conversion element arrays for converting polarized light with random polarization directions to one type of polarized light. Each of the two polarization conversion element arrays includes polarization separating surfaces for separating the polarized light with random polarization directions into two types of linearly polarized light and reflecting surfaces for reflecting one of the two types of the linearly polarized light produced by separation by the polarization separating surfaces. The polarization separating surfaces and the reflecting surfaces are alternately arranged between light-transmissive members. The two polarization conversion element arrays are separated by a predetermined space. The polarization separating surfaces of one array are arranged opposite to the polarization separating surfaces of the other array with respect to the predetermined space.

The light-incoming surface of each polarization conversion element array is divided into a first area where light incident thereupon directly impinges upon a polarization separating film surface and into a second area where light incident thereupon directly impinges upon a reflecting surface. Of the incident light, the portion of the light incident upon the first light-incoming area is converted into a predetermined type of polarized light beam (effective polarized light beam), while the portion of the light incident upon the second light-incoming area is converted into an ineffective polarized light beam. According to the first aspect of the present invention, light passing through a predetermined space is not incident upon the second area, so that it leaves the optical element, without being converted into an ineffective light beam, as a light beam with random polarization directions. Thus, the effective polarized component of the light beam with random polarization directions that passes through the predetermined space can be utilized, thereby increasing the efficiency with which the light of the optical element is used.

It is preferable that dummy regions not including the aforementioned polarization separating surfaces and the reflecting surfaces are formed using a transmissive material as the predetermined space side end of the two ends of each of the two polarization conversion element arrays.

This makes it possible to make the length of the path of light passing through each polarization conversion element array and the length of the path of light passing through the predetermined space to be close to each other. The light reflected by the predetermined space side end of the two ends of each of the two polarization conversion element arrays may not be effectively used, since it cannot effectively irradiate the irradiating surface depending on the direction of reflection. This problem can be mitigated using the above-described construction.

Regions not including the aforementioned polarization separating surfaces and the reflective surfaces may be formed using a transmissive material at the other one of the two ends of each of the two polarization conversion element arrays which is not disposed at the side of the predetermined space.

In general, the optical element of the first aspect of the present invention is used by setting the center thereof midway between the two conversion element arrays, that is in a predetermined space, so as to lie on the optical axis of the light source. Light having the light source, in general, tends to become weaker with increasing distance from the optical axis of the light source, so that even when light incident upon the end of each of the two polarization conversion element arrays which is not disposed at the side of the predetermined space is converted into a predetermined type of polarized light beam, there is almost no increase in the efficiency with which light is used. Thus, by virtue of the above-described construction, it is possible to use fewer polarization separating surfaces and reflecting surfaces, thereby reducing the cost of the optical element.

According to the second aspect of the present invention, there is provided an optical element containing a lens array composed of a plurality of lenses disposed in a matrix, and two polarization conversion element arrays, affixed to one of the surfaces of the lens array, for converting polarized light with random polarization directions to one type of polarized light.

Each of the two polarization conversion element arrays includes polarization separating surfaces for separating the polarized light with random polarization directions into two types of linearly polarized light and reflecting surfaces for reflecting one of the two types of the linearly polarized light produced by separation by the polarization separating surfaces. The polarization separating surfaces and the reflecting surfaces are alternately arranged between light-transmissive members. The two polarization conversion element arrays are separated by a predetermined space. The polarization separating surfaces of one array are arranged opposite to the polarization separating surfaces of the other array with respect to the predetermined space.

As is the first aspect of the present invention, in the second aspect of the present invention, the light-incoming surface of each polarization conversion element array is divided into a first area where light incident thereupon directly impinges upon a polarization separating film surface and into a second area where light incident thereupon directly impinges upon a reflecting surface. It is preferable that all of the light gathered by the lens arrays is incident upon the first area, but there are some parts of the light that are incident upon the second area. According to the construction of the second aspect of the present invention, of the light beams leaving the lens arrays, those that are not incident upon the polarization conversion element arrays and pass through a predetermined space are not incident upon the second area, so that the light beams with random polarization directions leave the optical element unchanged. Therefore, it is possible to use the effective polarized component included in the polarized light beams with random polarization directions that pass through such a predetermined space, thereby allowing more efficient use of the light of the optical element.

It is preferable that the polarization separating surfaces and the reflecting surfaces along the light-incoming surfaces of the polarization conversion element arrays be arranged at a pitch which is greater than ½ the pitch with which the lens arrays are averaged along the direction of arrangement of the polarization separating surfaces and the reflecting surfaces.

According to the above-described construction, each of the polarization conversion element arrays can be constructed to allow the light beams from the lens arrays to efficiently impinge thereupon, thereby allowing more efficient use of the light of the optical element.

According to a third aspect of the present invention, there is provided a polarization illumination device containing a light source and an optical element for converting light from the light source into one type of polarized light.

The optical element includes a lens array composed of a plurality of lenses disposed in a matrix, and two polarization conversion element arrays, affixed to one of the surfaces of the lens array, for converting polarized light with random polarization directions to one type of polarized light. Each of the two polarization conversion element arrays include polarization separating surfaces for separating the polarized light with random polarization direction into two types of linearly polarized light and reflecting surfaces for reflecting one of the two types of the linearly polarized light produced by separation by the polarization separating surfaces. The polarization separating surfaces and the reflecting surfaces are alternately arranged between light-transmissive members. The two polarization conversion element arrays are separated by a predetermined space. The polarization separating surfaces of one array are arranged opposite to the polarization separating surfaces of the other array with respect to the predetermined space.

According to the third aspect of the present invention, an optical element allowing light to be used with high efficiency is used, so that light can be used with greater efficiency in an illumination device.

It is preferable that the polarization separating surfaces be arranged in accordance with a distribution of light from the lens array. This allows light from the lens array to be used effectively, so that light of an illumination device can be used with even greater efficiency.

It is preferable that a polarization separating surface be disposed at a location closest to the predetermined space is each of the two polarization conversion element arrays, such that the center of this polarizing separating surface is shifted towards the predetermined space from the center axis of the lens of the lens arrays which is disposed closest to the polarization separating device.

A large amount of light leaves the light source at around the optical axis of the light source. The light quantity distribution of light leaving a portion around the optical axis of the light source is shifted towards the optical axis of the light source from the center axis of the lens disposed closest in the polarization separating surface disposed closest to the predetermined space. Thus, by virtue of such a construction, it is possible to effectively use the light near the optical axis of the light source, thereby allowing even more efficient use of the light of the illumination device.

According to a fourth aspect of the present invention, there is provided a projection display apparatus containing a polarization illumination device, modulating device for modulating light from the polarization illumination device in accordance with a received image signal, and projection optical device for projecting the light beam modulated by the modulating device.

The polarization illumination device includes a light source and an optical element for converting light from the light source incident thereupon to light with a predetermined polarization direction that leaves the optical element.

The optical element includes a lens array composed of a plurality of lenses disposed in a matrix, and two polarization conversion element arrays, affixed to one of the surfaces of the lens array, for converting polarized light with random polarization direction to one type of polarized light. Each of the two polarization conversion element arrays includes polarization separating surfaces for separating the polarized light with random polarization direction into two types of linearly polarized light and reflecting surfaces for reflecting one of the two types of the linearly polarized light produced by separation by the polarization separating surfaces. The polarization separating surfaces and the reflecting surfaces are alternately arranged between light-transmissive members. The two polarization conversion element arrays are separated by a predetermined space. The polarization separating surfaces of one array are arranged opposite to the polarization separating surfaces of the other array with respect to the predetermined space.

According to the fourth aspect of the present invention, an illumination device using an optical element allowing light to be used with higher efficiency is used, thereby allowing a brighter image to be projected onto a projection surface.

DETAILED DESCRIPTION OF PREFERRED EMBODIMENTS

A description will now be given of the preferred embodiments of the present invention.

Figure 1:
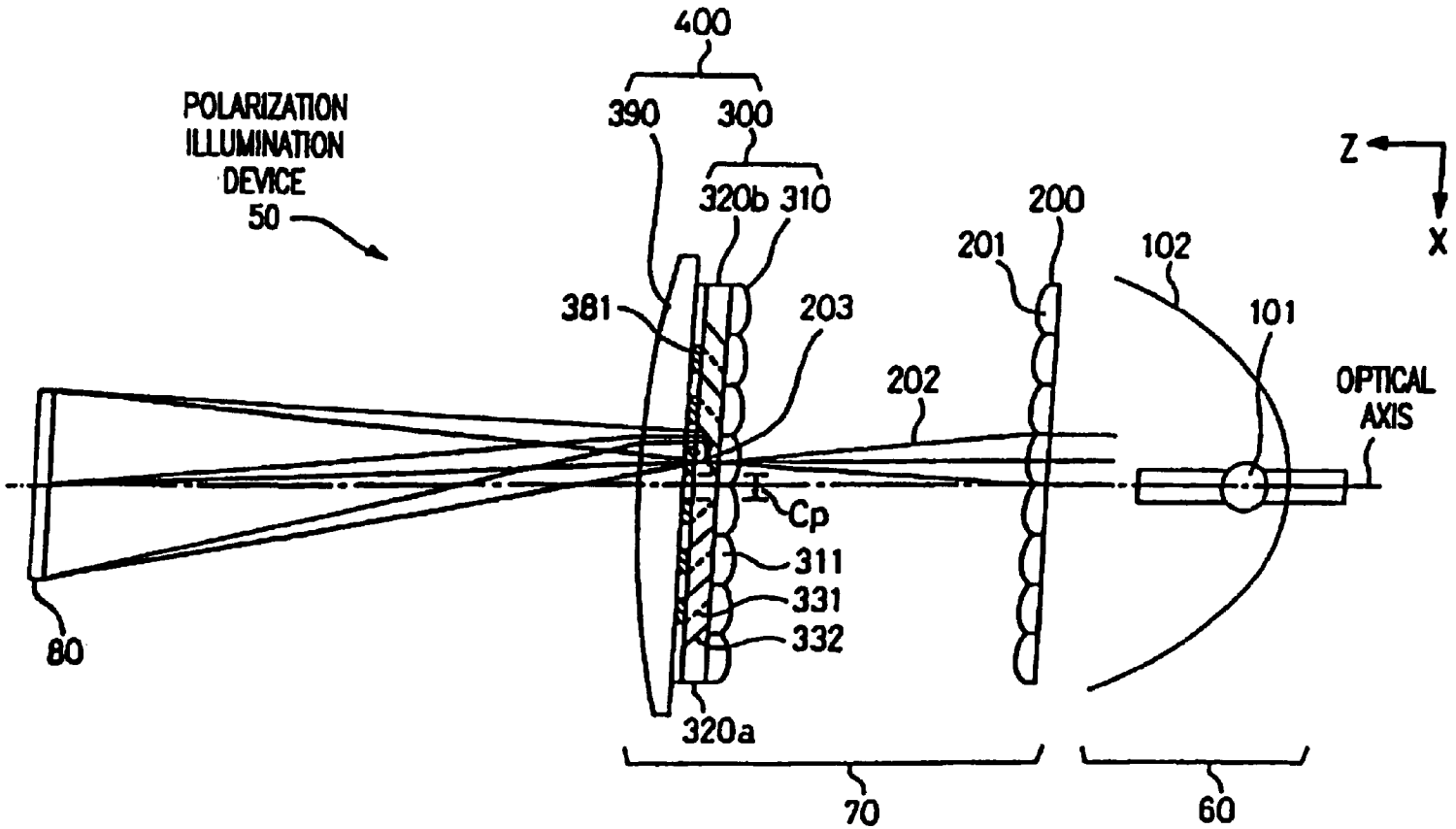
FIG. 1 is a schematic structural view as viewed in a plane of the main portion of a polarization nation device of an embodiment of the present invention.

A. Polarization Illumination Device:

FIG. 1 is a schematic structural view as viewed from a plane of the main portion of a polarization illumination device 50 of an embodiment of the present invention. The polarization illumination device 50 contains a light source 60 and a polarization portion 70. Light with random polarization directions that include an s-polarized component and a p-polarized component leave the light source 60. The light leaving the light source 60 is converted into one type of polarized light beam (such as an s-polarized light beam) in which the polarization directions substantially the same by means of the polarization portion 70, thereby illuminating an illumination area 80.

The light source 60 includes a lamp 101 and a parabolic surface reflector 102. The light emitted from the lamp 101 is reflected unidirectionally by the parabolic surface reflector 102, and converted into substantially parallel light beams that are incident upon the polarization portion 70.

Figure 2:
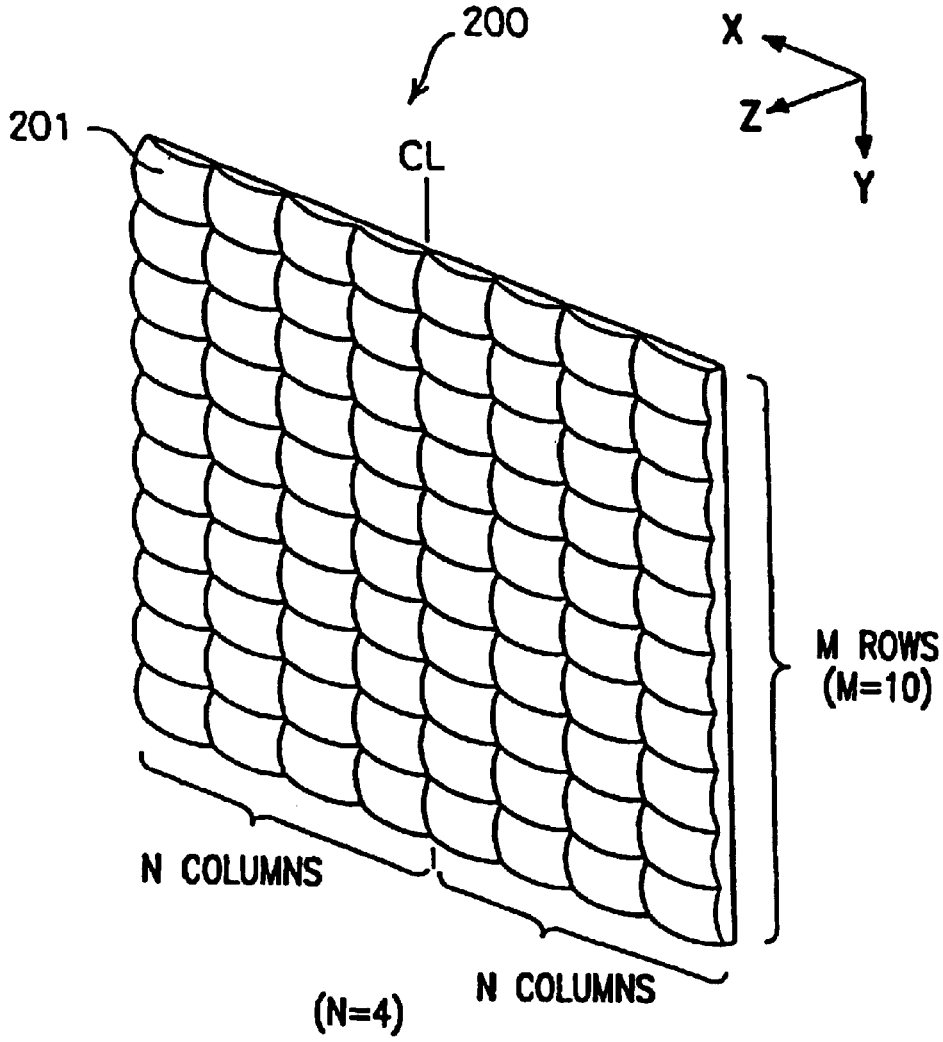
FIG. 2 is a perspective view of the optical element 200 of FIG. 1.

The polarization portion 70 includes a first optical main element 200 and a second optical main element 400. FIG. 2 is a perspective view of the first optical main element 200. The first optical main element 200 includes tiny and rectangular light beam separating lenses 201 arranged in a matrix arrangement with M rows and 2N columns. Thus, there is an N column of lenses on the left side of a center CL in the lens horizontal direction, and an N column of lenses on the right side of the center CL in the lens horizontal direction. In the example, M=10 and N=4. The first optical main element 200 is disposed such that the optical axis lies on the center of the first optical main element 200. As seen from the direction of arrow Z, the external shape of each of the light-beam separating lenses 201 is similar to the shape of the illumination area 80. Since, in the present embodiment, the illumination area 80 is assumed to be long in the X-direction, the external shape of each of the light beam separating lenses is also long horizontally in the X-Y plane.

The second optical main element 400 of FIG. 1 contains an optical element 300 and a light-outgoing side lens 390. The element 300 and the lens 390 are disposed such that their centers lie on the optical axis.

Figure 3:
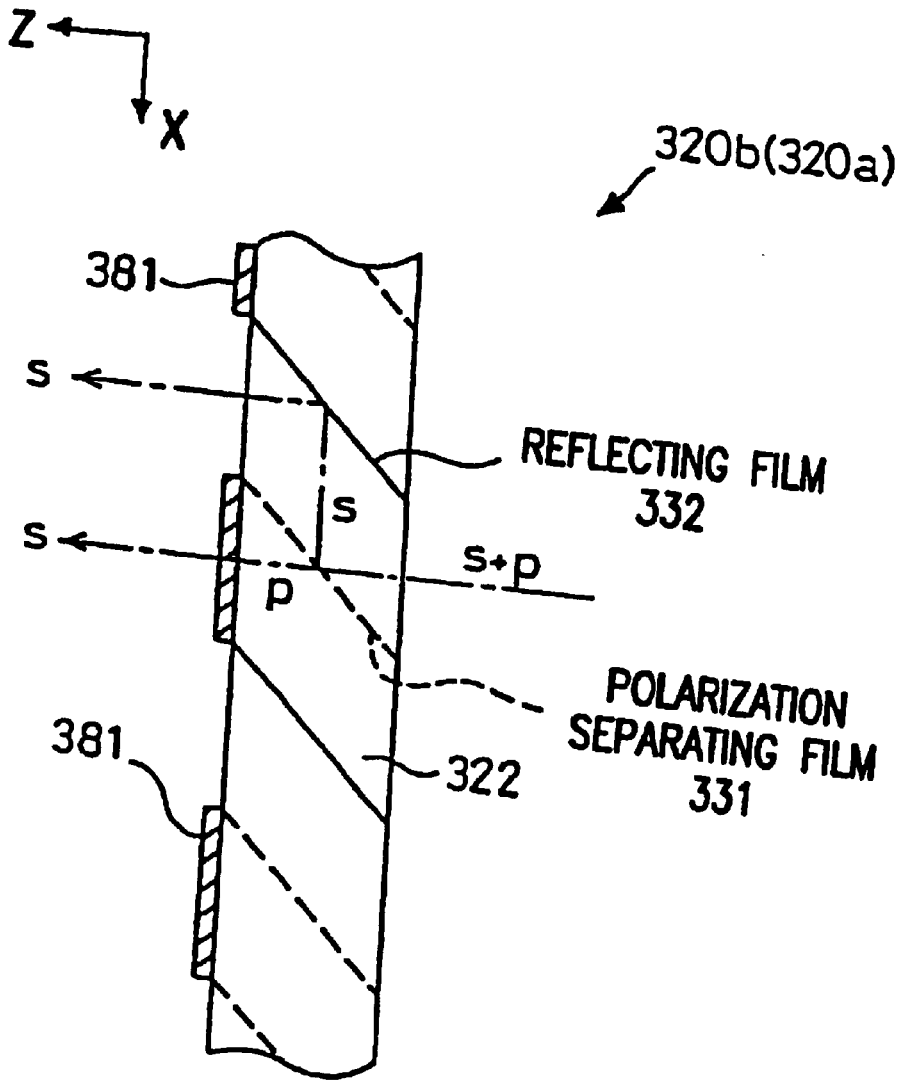
FIG. 3 is a view illustrating the basic operation of the polarization conversion element array 320b (320a)

The optical element 300 includes a focus lens array 310 and two polarization conversion element arrays 320a and 320b. The focus lens array 310 has the same structure as that of the first optical main element 200, and opposes the first optical main element 200. The focus lens array 310 gathers a plurality of light beams separated by each of the light beam separating lenses 201 of the first optical main element 200. The polarization conversion element arrays 320a and 320b each convert the light beams incident thereupon into one type of linearly polarized light beams (such as s-polarized light beam or p-polarized light beams), so that the light beams leave the arrays 320a and 320b as one type of polarized light beams. FIG. 3 is a view illustrating the basic operation of the polarization conversion element array 320b (320a). Light beams with random polarization directions, each including an s-polarized component and a p-polarized component, impinge upon the light-incoming surface of the polarization conversion element array. Each incident light beam is first separated into s-polarized light beams and p-polarized light beams by each polarization separating film 331. The s-polarized light beams are reflected substantially vertically by each polarization separating film 331. Then, they are reflected vertically by and leave the reflecting films 332. On the other hand, the p-polarized light beams pass through the polarization separating films 331. ½ phase plates 381 are disposed at the surface of the polarization separating films where the p-polarized light beam leave. The plates 381 convert the p-polarized light beams into s-polarized light beams that leave the plates 381. Thus, almost all of the light beams that have passed through the polarization conversion elements lave them as s-polarized light beams. When one wants light to leave the polarization conversion element as p-polarized light beams, a ½ phase plate 381 is placed at the surface where the s-polarized light beams reflected by the reflecting films 332 leave. The distinctive feature of the present invention is the structure of the optical element 300, which will be described in detail below.

The light-outgoing side lens 390 of FIG. 1 is used for transmitting the plurality of separated light beams leaving the optical element 300 (that is, the separated linearly polarized light beams formed by means of the polarization conversion element arrays 320a and 320b) such that each of them illuminate the entire illumination area 80.

The light leaving the light source section 60 and impinging upon the first optical main element 200 is separated into intermediate light beams 202. The intermediate light beams 202 converge within a plane (in the XY plane in FIG. 1) perpendicular to the optical axis by means of the light beam separating lenses 201 of the first optical main element 200 and the focus lenses 311 of the focus lens array 310 that gather the light beams. Light source images are formed at the location 203 where the intermediate light beams converge, with the number of light source images being the same as the number of light beam separating lenses 201. The light source images are formed near the polarization separating films 331 (see FIG. 3) in the polarization conversion element arrays 320a and 320b.

Of the light beams incident upon the optical element 300, those that are gathered by the focus lens array 310 and irradiate the polarization separating films 331 are converted into one type of linearly polarized light beams and leave the polarization separating films 331. The light beams that have left the optical element illuminate the illumination area 80 by means of the light-outgoing side lens 390. The whole illumination area 80 is uniformly illuminated by the plurality of light beams separated by means of the plurality of light beam separating lenses 201.

Figure 4:
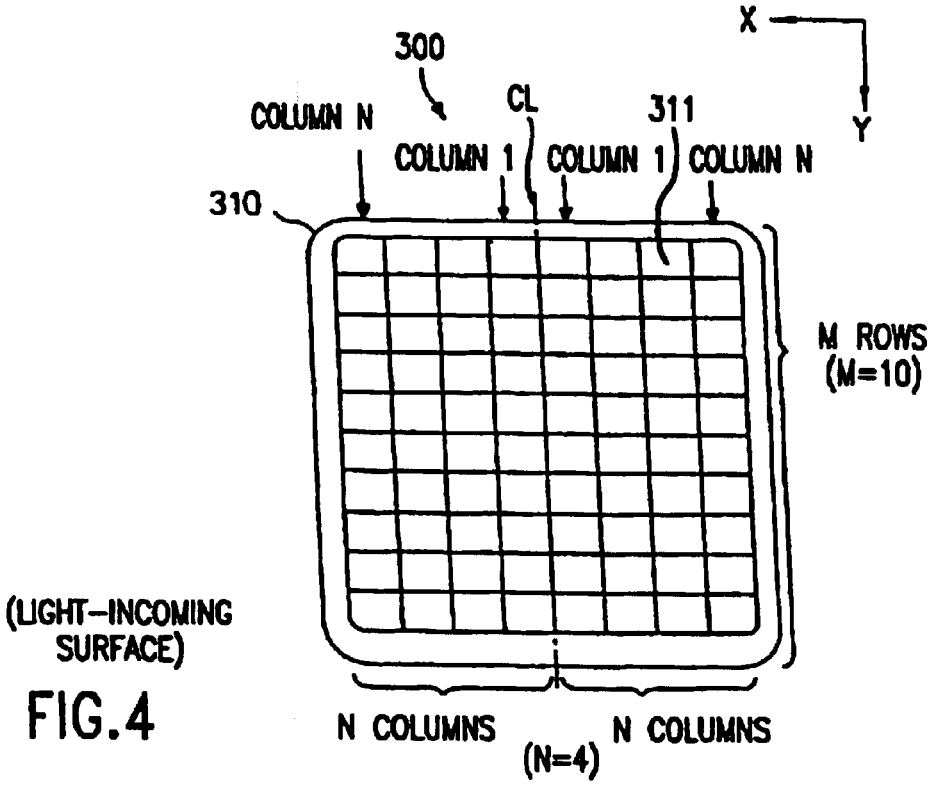
FIG. 4 is a front view showing the light-incoming surface of the optical element 300 of a first embodiment of the resent invention.
Figure 5:
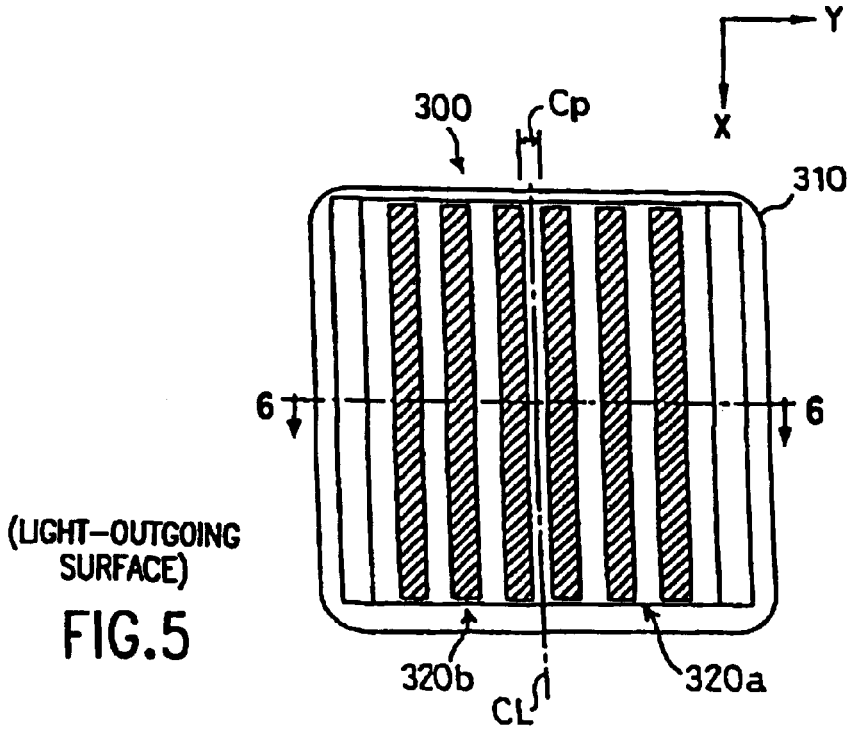
FIG. 5 is a rear view showing the light-outgoing surface of the optical element 300 of the first embodiment.
Figure 6:
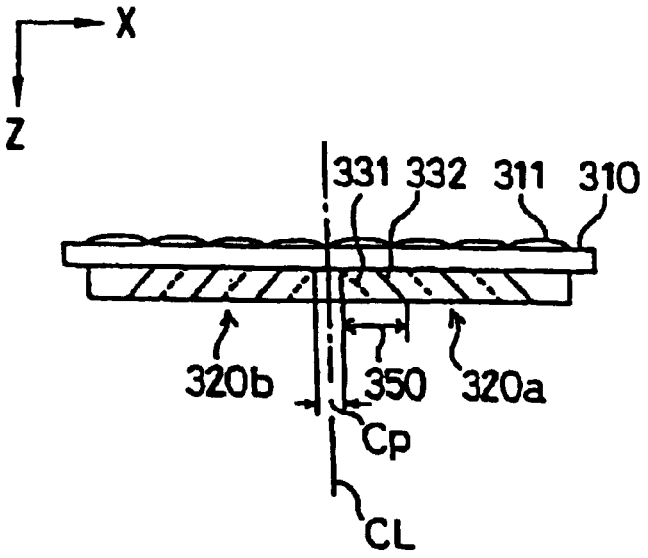
FIG. 6 is a sectional view taken along line A—A' of FIG. 5.
Figure 7:
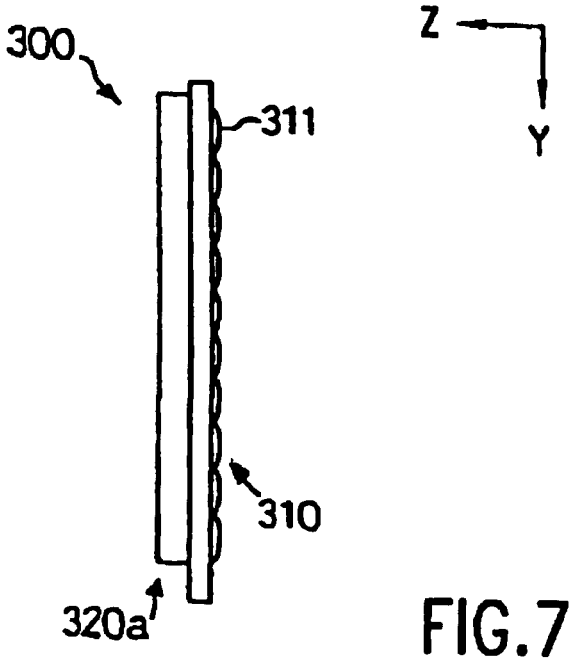
FIG. 7 is a side view of the optical element 300 of the first embodiment.

B: First Embodiment:

FIG. 4 is a front view showing the light-incoming surface of the optical element 300 of the first embodiment. FIG. 5 is a rear view of the light-outgoing surface thereof. FIG. 6 is a sectional side view taken along line A—A' of FIG. 5. FIG. 7 is a side view of the optical element 300.

In the optical element 300, two polarization conversion element arrays 320a and 320b are affixed to the flat light-outgoing surface of the light-gathering focus lens array 310, using an optical adhesive. The two polarization conversion element arrays 320a and 320b are arranged opposite to each other, and are disposed on the left and right sides of a center CL in the horizontal direction of the focus lens array 310 so as to be spaced apart by a predetermined space Cp which is described later. Like the first optical main element 200 (of FIG. 2), the focus lens array 310 contains substantially rectangular focus lenses 311 in a matrix arrangement with M rows and 2N columns. Thus, there are N columns on the left side of and N columns on the right side of the center CL in the lens horizontal direction. In this example, M=10 and N=4.

Figure 8:
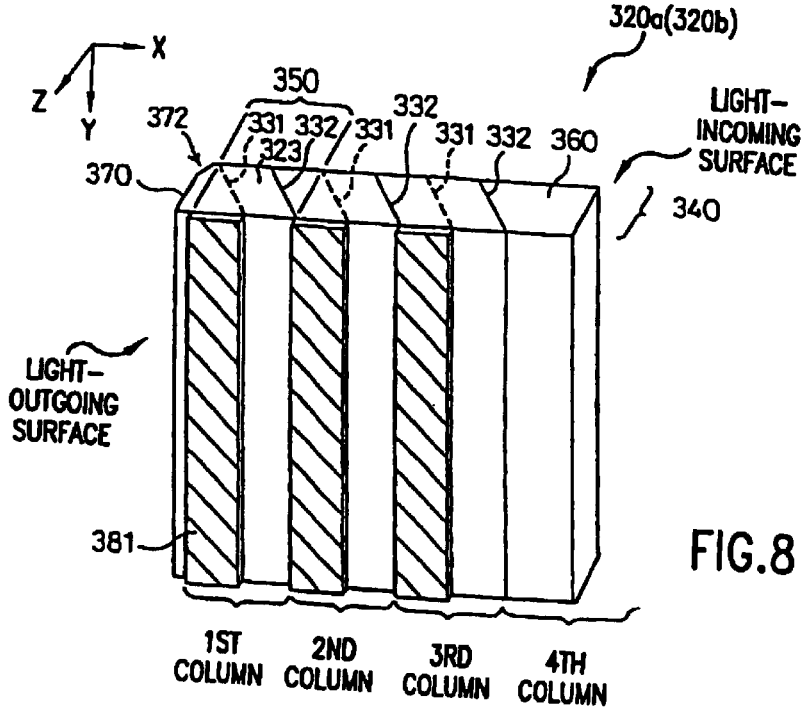
FIG. 8 is a perspective view of the structure of the polarization conversion element arrays 320a and 320b.

FIG. 8 is a perspective view of the structure of the polarization conversion element arrays 320a and 320b. The polarization conversion element arrays 320a and 320b each include a polarization beam splitter array 340 and ½ phase plates 381 (represented by slanted lines in the figure) selectively disposed at portions of the light outgoing surface of the polarization beam splitter array 340. The shape of the polarization beam splitter array 340 is formed by successively adhering a plurality of light-transmissive members 323 parallelogrammic and column-like in section. At the interfaces of the light-transmissive members 323 are alternately disposed polarization separating films 331 and reflecting films 332. ½ phase plates 381 are selectively disposed at the image portions in the X-direction of the light-outgoing surfaces of the polarization separating films 331 or the reflecting films 332. In the present embodiment, ½ phase plates 381 are selectively disposed at the image portion in the X-direction of the light-outgoing surfaces of the polarization separating films 331.

As described above using FIG. 3, light incident upon the polarization separation film 331 either passes through the polarization separation film 331 and is converted into a predetermined linearly polarized light beam by the ½ phase plate 381 and leaves it or is reflected by the polarization separation film 331 and then by the reflecting film 332 and leaves it as a predetermined linearly polarized light beam. Accordingly, one block including one polarization separation film 331, one reflecting film 332 adjacent thereto, and one ½ phase plate 381 can be considered as one polarization conversion element 350. The polarization conversion element arrays 320a and 320b are each formed by a plurality of such polarization conversion elements 350 arranged in the x-direction. In the present embodiment, N=4 for one side of the focus lens array 310, so that there are four columns of polarization conversion elements 350 on one side of the array 310. It is to be noted that a portion 360 equivalent to the polarization conversion element of the 4th column is only formed by a light-transmissive material, so that it does not include a polarization separation film 331 or a reflecting film 332. For description purposes, the portion 360 will be called light-transmissive portion that will be described later.

In FIG. 8, a dummy portion 370 composed of a light-transmissive material is provided at a side (end) surface of the polarization conversion element 350 in the leftmost column. A corner of an edge 372 at the light-incoming surface (adhered surface) of the dummy portion 370 is rounded or removed. The reason for this will be discussed later.

Figure 9:
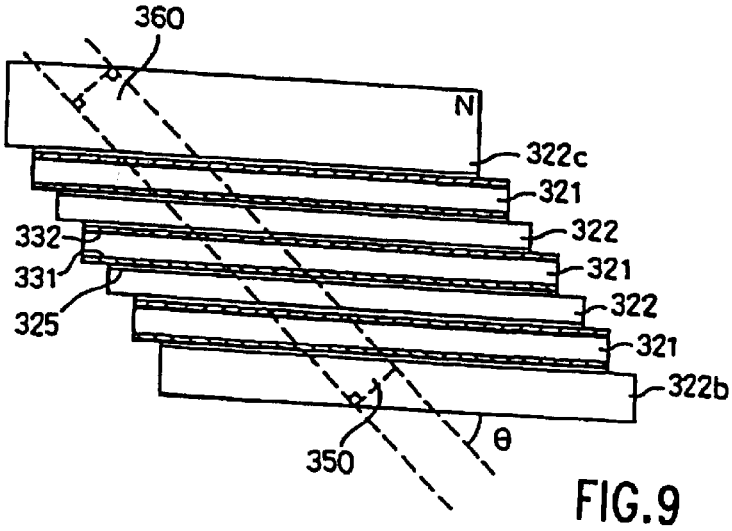
FIG. 9 is a view showing an example of how the polarization beam splitter array 340 is manufactured.

FIG. 9 is a view illuminating an example of how the polarization beam splitter array 340 is manufactured. The polarization beam splitter array 340 is formed by alternately bonding together plate glasses 321, each provided with, for example, a polarization separation film 331 and a reflecting film 332 such that they are alternately disposed, and plate glasses 322 that is not provided with anything, using an adhesive 325. Here, a plate glass 322b and 322c, each of which does not have the same thickness as the plate glasses 322, are bonded to the beginning and end of the bonded structure. This forms the dummy portion 370 and the light-transmissive portion 360 (FIG. 8). Accordingly, light-transmissive blocks are formed by cutting out virtually parallel bonded sections (represented by broken lines in FIG. 9) of the plurality of light-transmissive members 321, 322, 322b, and 322c at a predetermined angle θ from the surfaces thereof. It is preferable that θ be about 45 degrees. The protrusions at both ends are cut to a substantially rectangular shape. Grinding the cut surfaces of the light-transmissive blocks produces the polarization beam splitter array 340 (FIG. 8). It is to be noted that in the specification, a light-transmissive member is also called "base", and that the block formed by bonding together the plurality of light-transmissive members and a block portion cut out from this block are called "base block".

Figure 10:
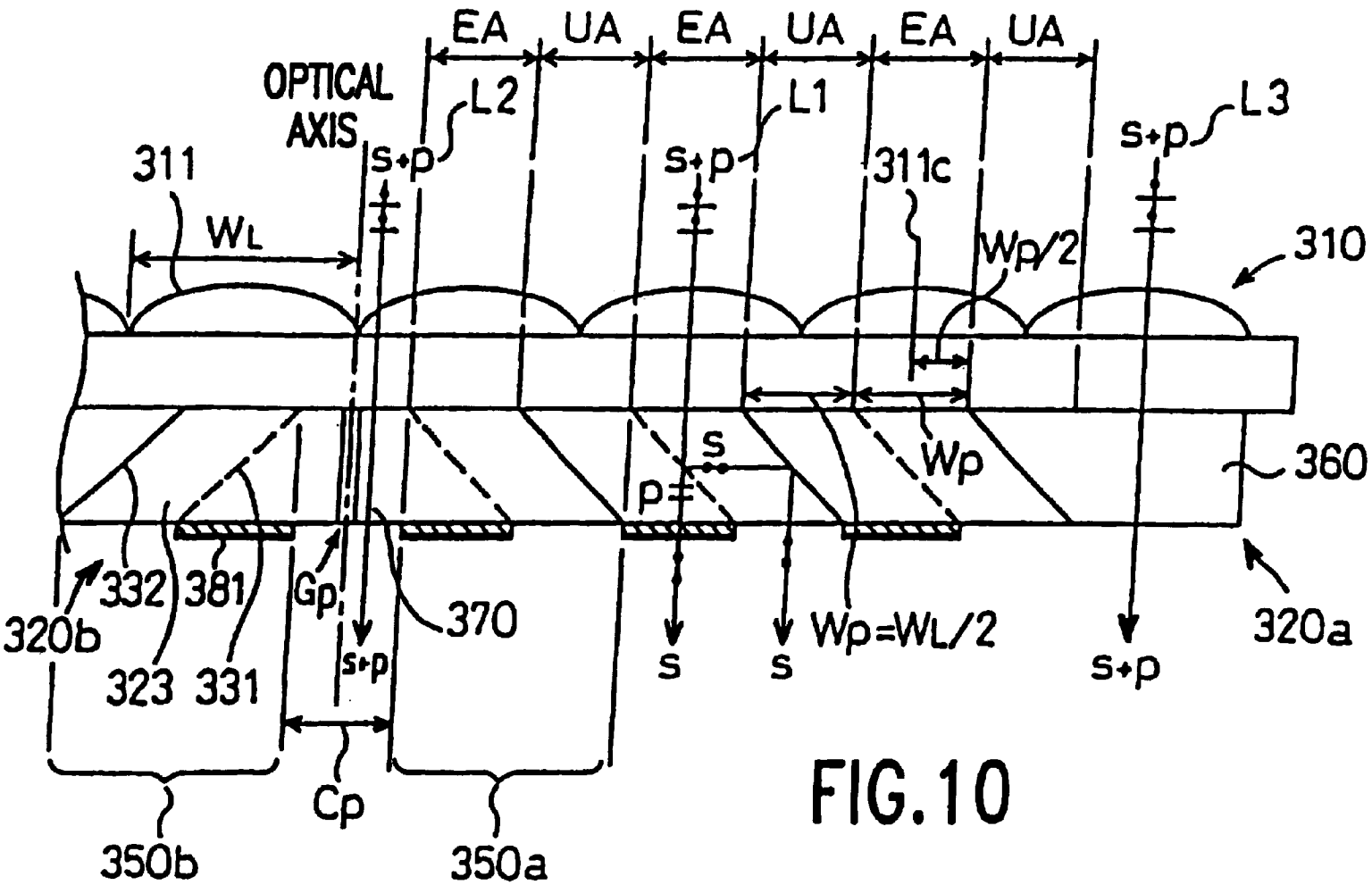
FIG. 10 is an enlarged partial sectional view taken along the line A—A' of FIG. 5.

FIG. 10 is a partial enlarged view taken along line A—A' of FIG. 5. The polarization conversion element arrays 320a and 320b are symmetrically disposed on opposite sides of the lens center, and have exactly the same functions, so that a description of only the polarization conversion element array 320a will be given below. The light-incoming surface of the polarization conversion element array 320a has alternately disposed effective light-incoming areas EA (the light-incoming surface portions corresponding to the polarization separation film 331) in which light incident to the polarization separation films 331 is converted into effective polarized light beams and ineffective light-incoming areas UA (the light-incoming surface portions corresponding to the reflecting films 332) in which light incident upon the reflective films 332 is converted into effective polarized light beams. The width Wp of each effective light-incoming area EA and each ineffective light-incoming area UA in the X-direction is ½ the width $W_L$ of the focus lens 311 in the X-direction. The center 311c of the focus lenses 311 is disposed so as to match the center of each effective light-incoming area EA in the X-direction. Here, the effective polarized light beams produced by the polarization conversion element 350 are s-polarized light beams.

The light gathered by the focus lens array 310 (that is light with random polarization directions that include an s-polarized composed and a p-polarized component) is incident upon the polarization conversion element array 320a. Of the light incident thereupon, light beams L1 incident upon an effective light-incoming area EA is separated into an s-polarized component and an p-polarized component by the associated polarization separation film 331, as described earlier using FIG. 3. The s-polarized light beam is reflected by the associated polarization separation film 331 and then by the associated reflecting film 332 and leaves it. The p-polarized light beam passes through the associated polarization separation film 331 and is converted into an s-polarized light beam by the associated ½ phase plate 381 and leaves it. Thus, almost all of the light incident upon the effective light-incoming area EA of the polarization conversion element array 320a is converted into s-polarized light beams and leave it.

½ phase plates 381 are selectively provided at the light-outgoing surfaces of the reflecting films 332, making it possible for selectively causing substantially only p-polarized light beams to leave the polarization conversion elements.

As described in the prior art, the portions of the light incident upon the ineffective light-incoming areas UA are converted into undesired polarized light beams (p-polarized light beams in the present embodiment). Ordinarily, the efficiency with which light is used is reduced, since the light is cut off by a light-shielding plate or the like provided at an ineffective light-incoming area UA. In a structure such as that of the polarization illumination device 50 of FIG. 1, in particular, the quantity of light becomes greatest around the optical axis of the light source, so that when there is an ineffective light-incoming area UA around the optical axis, the efficiency with which light is used is considerably reduced. The present invention makes it possible to overcome such a problem in a way described below.

In the first embodiment, the polarization conversion element 350a of the polarization conversion element array 320a closest to the optical axis (see FIG. 10) and the polarization conversion element 350b of the polarization conversion element array 320b closest to the optical axis (see FIG. 10) are disposed on the left and right side of the space Cp so as to operate each other. The dummy portions 370 of the two polarization conversion element arrays 320a and 320b as well as a gap Gp therebetween are located in the space Cp. Thus, of the light beams incident upon the focus lens array 310 around the optical axis, light beams L2 passes through the space Cp within which neither a polarization separating film 331 nor a reflecting film 332 are present and leaves the gap Cp unchanged. The light beam passing through the space Cp is a light beam consisting of an effective s-polarized component as well as an ineffective p-polarized component. Of the components of the outgoing light beam passing through the space Cp, the required polarized component (the s-polarized component in the present embodiment) alone can be made to leave the space Cp by placing a polarization plate at the light-outgoing plane side for effective use. When the polarization illumination device 50 (FIG. 1) is applied to a projection display apparatus described later, a polarization plate is ordinarily provided at the light-incoming surface of a liquid crystal light valve being an illumination area 80. Therefore, in this case, it is not necessary to provide a separate polarization plate.

The light-transmissive portion 340 at the outermost side of the polarization conversion element array 320a is a portion through which light from the lens at the outermost side of the focus lens array 310 passes. The light source of the polarization illumination device 50 having the structure of the present embodiment is ordinarily disposed on a centerline extending through the center of the light-incoming surface of the focus lens array 310 and being perpendicular to the light-incoming surface (see FIG. 4), so that the quantity of light incident upon the outer side of the lens array 310, that is the light-transmissive portion 360, is smallest. In such a situation, there is often not much difference between the quantities of light that can be effectively used in the entire first optical main element 300 (see FIG. 1) when the light incident upon the outermost side of the focus lens array 310 is converted into a polarization light beam by the polarization conversion element for use compared to when the light just passes through the array 310 unchanged. Thus, the light-transmissive portion 360 at the outermost side of the focus lens array 310 of the polarization conversion element array 320a is formed only by a light-transmissive member, so that it does not take structure of the polarization conversion element 350 (see FIG. 8), and is not provided with a ½ phase plate 381. This causes light beam L3 passing through the lens at the outermost side of the focus lens array 310 to pass through and leave the light-transmissive portion 360 unchanged. The light beam leaving the light-transmissive portion 360 is, like the light beam passing through and leaving the space Cp, a light beam containing an effective s-polarized component and an ineffective p-polarized component. Of the outgoing polarized components leaving the light-transmissive portion 360, only the required polarized component (the s-polarized component in the present embodiment) is utilized by providing a polarization plate at the light-outgoing side of the light-transmitting portion 360, allowing the light beam to be utilized as an effective light beam.

Figure 11A:
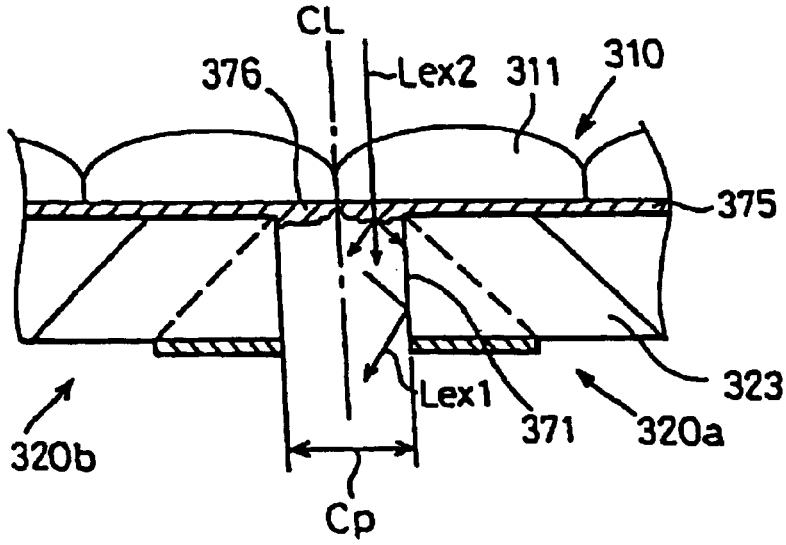
FIGS. 11A and 11B are enlarged views of the predetermined space side ends of the polarization conversion element arrays 320a and 320b, shown in FIG. 8.
Figure 11B:
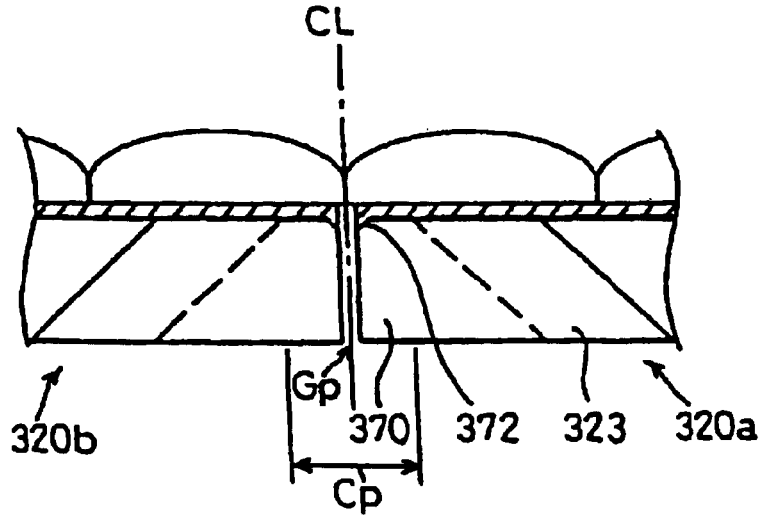

FIGS. 11A and 11B are enlarged views of the predetermined space side ends of the polarization conversion element arrays 320a and 320b of FIG. 8. In FIG. 11A, it is assumed that polarization conversion element arrays 320a and 320b that do not have dummy portions 370 shown in FIG. 8 are disposed in the horizontal direction to the light-outgoing surface of the focus lens array 310, with a predetermined space Cp provided therebetween with respect to the center CL. Here, there is a difference between the light path lengths of the light beam passing through the space Cp and the light beam passing through the polarization conversion element arrays 320a and 320b. If possible, it is preferable that lengths of the light paths be as close to each other as possible. Depending on the direction of reflection, the light beam Lex1 reflected by the ends 371 of the polarization conversion element arrays 320a or 320b cannot be used effectively. The focus lens array 310 and the polarization conversion element arrays 320a and 320b are bonded together using, for example, an indicative 375 shown in FIG. 11A. Here, an adhesive protruding portion 376 is produced at the predetermined space Cp. The light beam Lex2 passing through such an adhesive protruding portion 376 is reflected irregularly, since the adhesive surface is not even, thereby preventing effective use of the light.

In FIG. 11B, it is assumed that dummy portions 370 composed of the same material as the light-transmissive members 323 of the polarization conversion element arrays 320a and 320b are disposed in the predetermined space Cp. When the dummy portions are provided, as shown in FIG. 8, it is possible to mitigate problems regarding differences in the lengths of the light paths and differences in the reflection direction of the light beam Lex1 reflected at an end surface of the polarization conversion element arrays 320a or 320b. As shown in FIG. 11B, the amount of protrusion of the adhesive is made smaller by providing dummy portions 370, and either rounding or removing the corners of the sides of the dummy portions 370 370 at the light-incoming surfaces (adhered surfaces). The gap Gp at the center portion does not have to be formed. Taking into account the accuracy of alignment of the polarization conversion element arrays 320a and 320b with the light-outgoing surface of the focus lens array 310 when bonding them together, however, it is preferable there be slight gap between the dummy portions 370 at the center portion, when the polarization conversion element arrays 320a and 320b have been added to the light-outgoing surface of the focus lens array 310.

Figure 12:
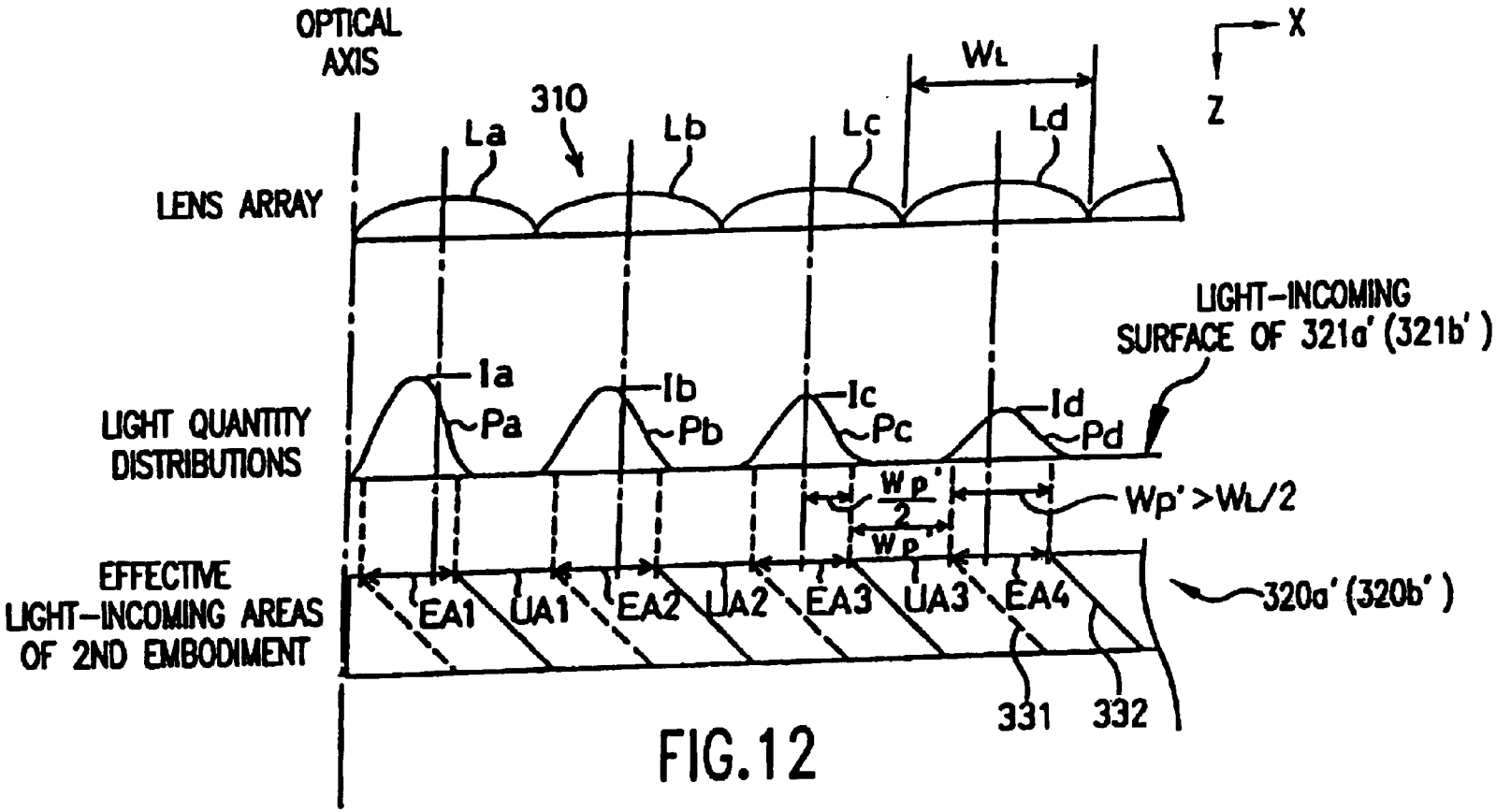
FIG. 12 is a view showing an optical element 300' of the second embodiment of the present invention.

C. Second Embodiment:

FIG. 12 is a diagram illustrating an optical element of the second embodiment. The middle portion of FIG. 12 shown the distributions of the quantities of light illuminating the light-incoming surface of a polarization conversion element array 320a', after gathering of the light by each of the lenses La to Ld of the lens array 310 in a structure such as that of the polarization illumination device 50 (FIG. 1). In general, the intensity Ia of the light gathered by the lens La nearest the optical axis is the strongest, while the intensity of the light gathered by the lens furthest from the optical axis is weakest. In FIG. 12, the intensity Id of the light gathered by the fourth lens is the weakest. The light quantity distribution shifts from its associated lens center towards or away from the optical axis starting from a certain lens position (the position of the third lens Lc in FIG. 12), so that for the light quantity distributions of the lenses La to Ld, the closer the lens is to the optical axis the more the distribution is shifted towards the optical axis from its associated lens center, and the further away the lens is from the optical axis the more the distribution is shifted towards the opposite side of the optical axis from its associated lens center. In FIG. 12, the light quantity distribution Pc of the third lens Lc is centered at about the lens center, while the light quantity distribution Pa and Pb of the lenses La and Lb that are closer to the optical axis than the lens Lc are shifted towards the optical axis with respect to their lens center. The light quantity distribution Pd of the lens Ld that is farther from the optical axis than the lens Lc is shifted away from the optical axis with respect to its lens center.

In such a case, when the centers of the effective light-incoming areas of the polarization conversion element arrays are aligned with their corresponding lens centers, without exception, light loss occurs as a result of a shift in the light quantity distribution as described above. This loss of light becomes particularly large at around the optical axis of the light source when the distribution of light from a lens array and an effective light-incoming area are not aligned. Thus, it is preferable that the centers of each of the effective light-incoming areas of the polarization conversion element array 320a' be arranged in accordance with the distribution of light leaving the lens array 310, that is in accordance with the peak interval of the distribution of the light from the lens array 310. In addition, in order to utilize the light gathered by the lens array 310 more effectively, it is preferable that the light gathered by the lenses closer to the optical axis of the light source be used more effectively. In particular, it is preferable to substantially align the center of the effective light-incoming area EA1 of the polarization conversion element array 320a' disposed closest to the optical axis with the peak position of the light distribution Pa of light from the lens La disposed near the optical axis, when the light quantity around the optical axis of the light source is large, or when the distribution P axis shifted towards the optical axis of the light source with respect to the center of the lens La.

According to the second embodiment, it is possible to overcome problems related to light intensities and light quantity distributions that depend on a lens position of the focus lens array. The optical element of the second embodiment has the same basic structure as that of the optical element of the first embodiment, but differs from it in that it utilizes polarization conversion element arrays 320a' and 320b' whose effective light-incoming areas EA (designated EA1 to EA4 in the figure) and ineffective light-incoming areas (designated UA1 to UA4 in the figure) each have a width Wp' in the X-direction that is larger than ½ the width $W_L$ in the X-direction of each of the lenses La to Ld of the lens array 310. FIG. 12 only shows the polarization conversion element array 320a' side. The polarization conversion element array 320b' side is simply symmetrical to the polarization conversion element array 320a side with reference to the optical axis.

For instance, the polarization conversion element array 320a' is disposed such that the center of the lens Lc in the third column is aligned with the center of its associated effective light-incoming area EA3. Ordinarily, the width of each of the ineffective light-incoming areas UA (designated UA1 to UA4 in the figure) is equal to the width Wp' of each of the effective light-incoming area EA, so that the left two effective light-incoming area EA1 and EA2 are shifted from the centers of their corresponding lenses La and Lb towards the optical axis. On the other hand, the rightmost effective light-incoming area EA4 is shifted from the center of the lens Led away from the optical axis. As a result, each of the effective light-incoming areas EA1 to EA4 substantially is aligned with the location of its corresponding light quantity distribution of the lens array 310. Since a predetermined number of lenses, such as two or three lenses, disposed close to the optical axis has a strong light intensity, it is particularly preferable to align the distribution of the quantity of light gathered by each of these lenses substantially with their respective effective light-incoming areas. By virtue of such a construction, according to the second embodiment, it is possible to use the light with greater efficiency. How much larger the width of an effective light-incoming area should be made than ½ the width of the associated lens, or which lens should be used as a reference to place an effective light-incoming area can be experimentally determined easily from the number of lens arrays and the relationship between the light quantity distribution and its associated lens. The widths of the effective light incoming areas and ineffective light-incoming areas do not have to be made greater than ½ the widths of their corresponding lenses. The widths are determined by the actual distribution of the quantity of light irradiating the light-incoming surface of the polarization conversion array.

Figure 13:
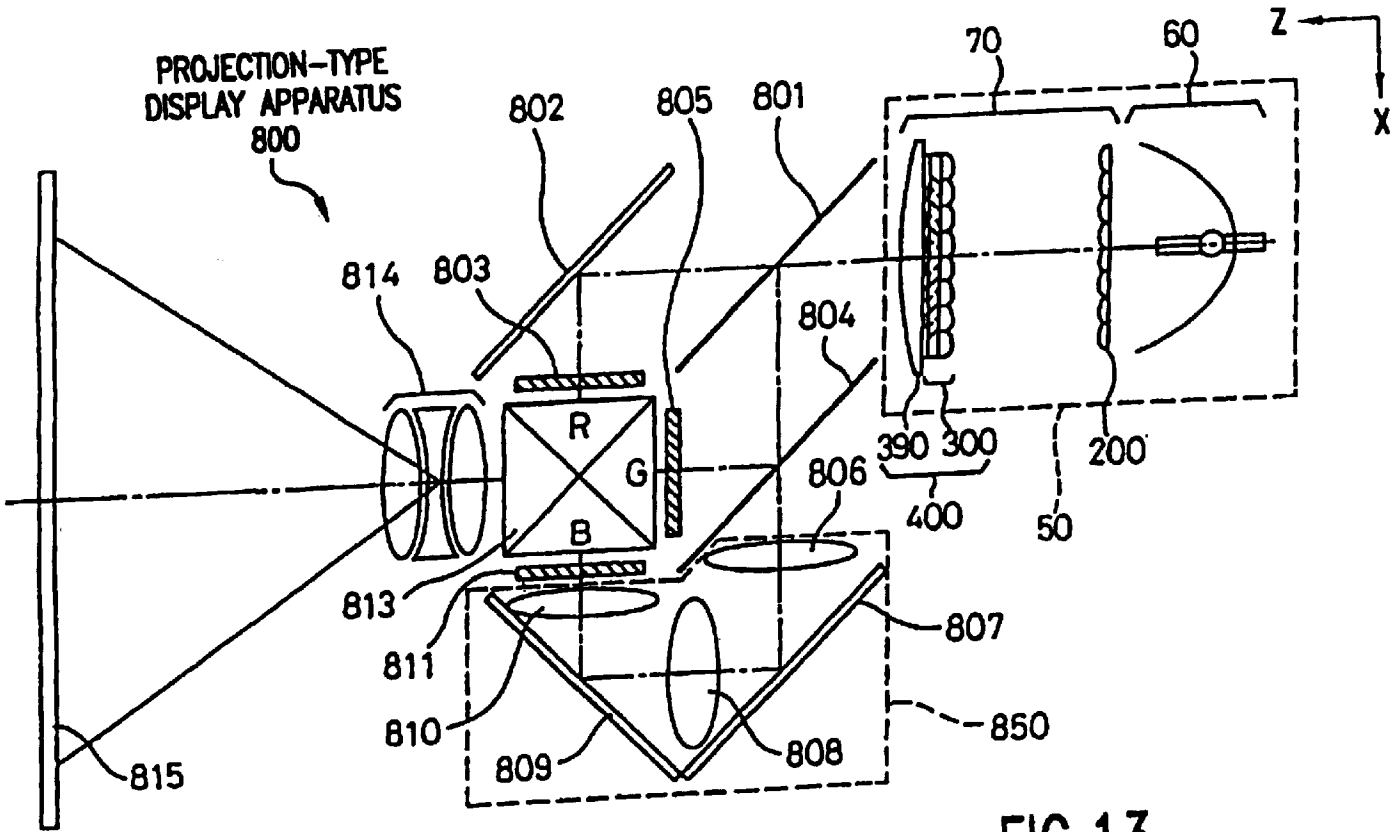
FIG. 13 is a schematic structural view of the main portion of a projection display apparatus 800 provided with the polarization illumination device 50 of FIG. 1.
Figure 14A:
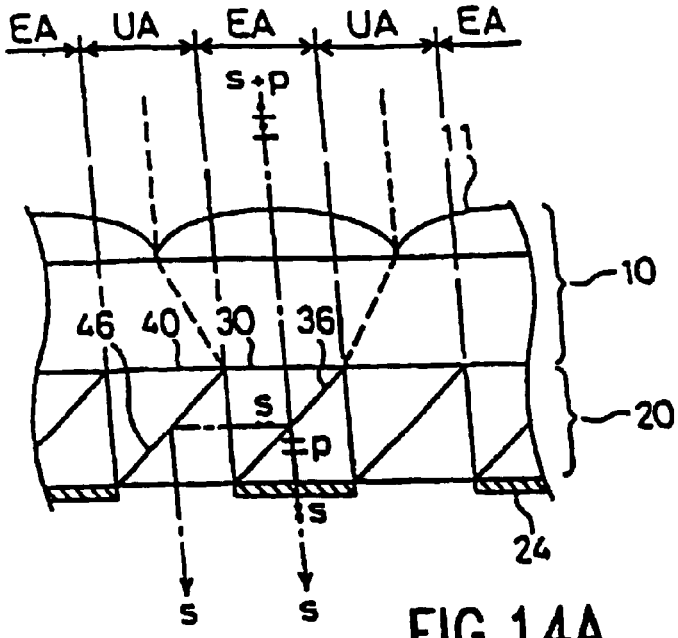
FIG.14A PRIOR ART
FIGS. 14A and 14B are plan views of a conventional optical element.
Figure 14B:
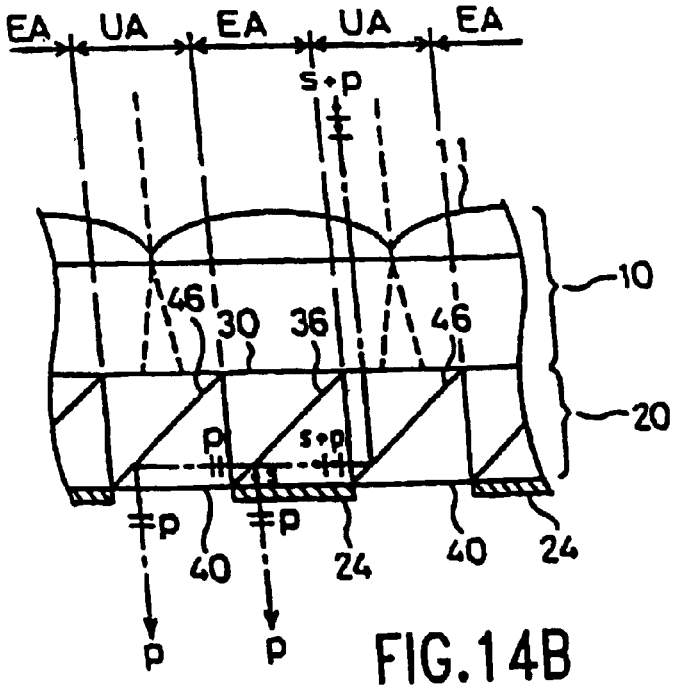
FIG.14B PRIOR ART

D. Projection display apparatus:

FIG. 13 is a structural schematic view of the main portion of a projection display apparatus provided with the polarization illumination device 50 of FIG. 1. The projection display apparatus includes the polarization illumination device 50, dichroic mirrors 801 and 804, reflecting mirrors 802, 807, and 809, lenses 806, 808, and 810, three liquid crystal light valves 803, 805, and 811, a cross dichroic prism 813, and a projection lens assembly 814.

The dichroic mirrors 801 and 804 each function as a color light separating means for separating white lights into three color components, red, blue, and green. The three liquid crystal light valves 803, 805, and 811 each functions as a light modulating means for modulating the three color components in order to form an image, in accordance with the image information or signal received. The cross dichroic prism 813 functions as color light combining means for combining the three color components to form a color image. The projecting lens assembly 814 functions as a projection optical system for projecting the light carrying the combined color image onto a screen 815.

The red component of white light from the polarization illumination device 50 passes through the dichroic mirror 801 reflecting a blue component and a green component, whereas the blue component and the green component are reflected thereby. The red component that has passed therethrough is reflected by the reflecting mirror 802 and arrives at the red component liquid crystal light valve 803. On the other hand, of the blue component and the green component is reflected by the green component reflected dichroic mirror 804 and arrives at the green component liquid crystal light valve 805. The blue component passes through the second dichroic mirror 804.

In the present embodiment, the path of the blue component is the longest. Thus, for the blue component, following the dichroic mirror 804, a light-guiding means 850 formed by a relay lens unit including the light-incoming lens 806, the intermediate lens 808, and the light-outgoing lens 810 is provided. The blue component, after passing through the green component reflective dichroic mirror 804, passes through the light-incoming lens 806, is reflected by the reflecting mirror 807, and is guided to the intermediate lens 808. Then, after being reflected by the reflecting mirror 809, it is guided to the light-outgoing lens 810 and reaches the blue component liquid crystal light valve 811. The three liquid crystal light valves 803, 805, and 811 correspond to the illumination area 80 of FIG .1.

In accordance with the image signal (information) provided by an external control circuit (not shown), the three liquid crystal ligh valves 803, 805, and 811 modulate their corresponding color components to generate color light beams containing image information of the light components. The modulated three color components are incident upon the cross dichroic prism 813. A dielectric multi-layered film reflecting a red component and a dielectric multi-layered film reflecting a blue component are formed into the shape of a cross at the cross dichroic prism 813. These dielectric multi-layered films combine the three color components, forming a light beam representing the color image. The light beam in which the light components have been combined is projected onto the screen 815 by the projecting lens assembly 814 being a projection optical system in order to enlarge the image for display.

The projection display apparatus projection display apparatus uses liquid crystal light valves 803, 805, and 811 serving as light modulating means of the type that modulates a light beam polarized in a particular direction (that is, an s-polarized light beam or a p-polarized light beam). Polarization plate (not shown) are ordinarily affixed onto the light-incoming side and the light-outgoing side of each of the liquid crystal light valves. Therefore, a light beam polarized in a predetermined direction, such as an s-polarized light beam, is modulated and impinges upon the cross dichroic prism 813. Here, of the light beams incident upon the optical element 300, those gathered by the focus lens array 310 and irradiating the polarization separating films 331, as shown in FIG. 10, are all converted into s-polarized light beams and leave the optical element 300. The light beams from the optical element 300 illuminate the liquid crystal light valves 803,805, and 811 through a light-outgoing side lens 390.

Of the light beams incident upon the optical element 300, those that could not be completely gathered by the focus lens array 310 and irradiate their respective reflecting films 332 are converted into p-polarized light beams, as described in the conventional example, and leave the optical element 309 to illuminate the liquid crystal light valve 803, 805, and 811. As mentioned above, however, polarizing plates are provided at the light-incoming surfaces of the liquid crystal light valves 803, 805, and 811 to block p-polarized light beams, whereby only s-polarized light beams are used. On the other hand, the light beams passing through the space Cp in the optical element of the above-described embodiment of the present invention leave the space Cp and illuminate the liquid crystal light valves 803, 805, and 811, without being converted into a polarized light beam. Since the illuminating light is white light including an s-polarized component usable at the liquid crystal light valves 803, 805, and 811, it is possible to use only the s-polarized component of the light irradiating the liquid crystal light valves 803, 805, and 811. Thus, since the projection display apparatus 800 of FIG. 13 incorporates the polarization illumination device 50 using the optical element 300 of the above-described embodiment of the present invention, it is possible to use the light more efficiently than in the conventional case.

As can be understood from the foregoing description, the optical elements of the present embodiments of the present invention can allow light in the projection display apparatus to be used more efficiently than in conventional projection display apparatuses. Therefore, the image projected onto the screen 815 can be made brighter.

While the preferred embodiments of the present invention have been described, it is to be understood that various modifications may be made without departing from the spirit and scope of the appended claims, as follows.

The polarization illumination device of the present invention may be used in apparatuses other than the projection display apparatus of FIG. 13. For example, the polarization beam splitter array in accordance with the present invention may also be applied to a projection display apparatus that does not project a color image, but projects a black-and-white image. In this case, compared to the apparatus of FIG. 13, only one liquid crystal light valve needs to be used, and the color light separating means for separating a light beam into its three color components and a color light combining means for combining the three color components of the light beam are not required. In addition, the present invention can be applied to a projection-type color display apparatus using only one light valve. Further, the present invention can be applied to a projection display apparatus using a reflective light valve or an image display apparatus using the polarization illuminating light of a rear-type display apparatus or the like.

What is claimed is:

[1. An optical element comprising:

two polarization conversion element arrays for converting polarized light with random polarization directions to one type of polarized light, wherein each of said two polarization conversion element arrays includes polarization separating surfaces for separating the polarized light with random polarization directions into two types of linearly polarized light and reflecting surfaces for reflecting one of the two types of the linearly polarized light produced by separation by said polarization separating surfaces, said polarization separating surfaces and said reflecting surfaces being alternately arranged between light-transmissive members, and wherein said two polarization element arrays are separated by a predetermined space with no elements disposed between the two polarization conversion element arrays, said polarization separating surfaces of one of said two polarization conversion element arrays are arranged opposite to said polarization separating surfaces of the other of said two polarization conversion element arrays with respect to the predetermined space.]

[2. An optical element according to claim 1, further comprising a dummy region including neither said polarization separating surfaces nor said reflecting surfaces, said dummy region being made of a transmissive material and disposed on an end at a predetermined space side of each of said two polarization conversion element arrays.]

[3. An optical element according to claim 1, further comprising a region including neither said polarization separating surfaces nor said reflecting surfaces, said region being made of a transmissive material and disposed on an end opposite to a predetermined space side of each of said two polarization conversion element arrays.]

[4. An optical element comprising:

a lens array composed of a plurality of lenses disposed in a matrix; and two polarization conversion element arrays, affixed to one surface of said lens array, the two polarization conversion element arrays converting polarized light with random polarization direction to one type of polarized light, wherein each of said two polarization conversion element arrays includes polarization separating surfaces for separating the polarization light with random polarization direction into two types of linearly polarized light and reflecting surfaces for reflecting one of the two types of the linearly polarized light produced by separation by said polarization separating surfaces, said polarization separating surfaces and said reflecting surfaces being alternately arranged between light-transmissive members, and wherein said two polarization conversion element arrays are separated by a predetermined space with no elements disposed between the two polarization conversion element arrays, said polarization separating surfaces of one of said two polarization conversion element arrays are arranged opposite to said polarization separating surfaces of the other of said two polarization conversion element arrays with respect to the predetermined space.]

[5. An optical element according to claim 4, further comprising a dummy region including neither said polarization separating surfaces nor said reflecting surfaces, said dummy region being made of a transmissive material and disposed on an end at a predetermined space side of each of said two polarization conversion element arrays.]

[6. An optical element according to claim 5, wherein a corner at the side of the predetermined space side of said dummy region is removed.]

[7. An optical element according to claim 4, further comprising a region including neither said polarization separating surfaces nor said reflecting surfaces, said region being made of a transmissive material and disposed on an end opposite to a predetermined space side of each of said two polarization conversion element arrays.]

[8. An optical element according to claim 4, wherein said polarization separating surfaces and said reflecting surfaces of each of said polarization conversion element arrays are arranged along a direction of arrangement at a pitch that is greater than ½ an arrangement pitch of said lens array disposed along the direction of arrangement of said polarization separating surfaces and said reflecting surfaces.]

[9. A polarization illumination device comprising:

a light source; and an optical element for converting light from said light source into one type of polarized light, wherein said optical element includes a lens array composed of a plurality of lenses disposed in a matrix; and two polarization conversion element arrays, affixed to one surface of said lens array, for converting polarized light with random polarization directions to one type of polarized light, wherein each of said two polarization conversion element arrays includes polarization separating surfaces for separating the polarized light with random polarization directions into two types of linearly polarized light and reflecting surfaces for reflecting one of the two types of the linearly polarized light produced by separation by said polarization separating surfaces, said polarization separating surfaces and said reflecting surfaces being alternately arranged between light-transmissive members, and wherein said two polarization conversion element arrays are separated by a predetermined space with no elements disposed between the two polarization conversion element arrays, said polarization separating surfaces of one of said two polarization conversion element arrays are arranged opposite to said polarization separating surfaces of the other of said two polarization conversion element arrays with respect to the predetermined space.]

[10. A polarization illumination device according to claim 9, further comprising a dummy region including neither said polarization separating surfaces not said reflecting surfaces, said dummy region being made of a transmissive material and disposed on an end at a predetermined space side of each of said two polarization conversion element arrays.]

[11. A polarization illumination device according to claim 10, wherein a corner at the predetermined space side of said dummy region is removed.]

[12. A polarization illumination device according to claim 9, further comprising a region including neither said polarization separation surfaces nor said reflecting surfaces, said region being made of a transmissive material and disposed on an end opposite to a predetermined space side of each of said two polarization conversion element arrays.]

[13. A polarization illumination device according to claim 9, wherein said polarization separating surfaces are arranged in accordance with a distribution of light leaving said lens array.]

[14. A polarization illumination device according to claim 9, further comprising a polarization separating surface disposed at a location closest to the predetermined space between said two polarization conversion element arrays, such that a center of said closest polarization separating surface is disposed closer towards the predetermined space than a center axis of a lens among said plurality of lenses of said lens array which is disposed closest to said closet polarization separating surfaces.]

[15. A polarization illumination device according to claim 9, wherein said polarization separating surfaces and said reflecting surfaces of each of said polarization conversion element arrays are arranged along a direction of arrangement at a pinch that is greater than ½ an arrangement pitch of said lens array disposed along the direction of arrangement of said polarization separating surfaces and said reflecting surfaces.]

[16. A projection display apparatus comprising:

a polarization illumination device;

modulating means for modulating light from said polarization illumination device in accordance with a received image signal; and projection optical means for projecting the light beam modulated by said modulating means, wherein said polarization illumination device includes a light source; and an optical element for converting light from said light source incident thereupon to light with a predetermined polarization direction that leaves said optical element, and wherein said optical element includes a lens array composed of a plurality of lens disposed in a matrix; and two polarization conversion element arrays, affixed to one surface of said lens arrays, for converting polarized light with random polarization directions to one type of polarized light, wherein each of said two polarization conversion element arrays includes polarization separating surfaces for separating the polarized light with random polarization directions into two types of linearly polarized light and reflecting surfaces for reflecting one of the two types of the linearly polarized light produced by separation by said polarization separating surfaces, said polarization separating surfaces and said reflecting surfaces being alternately arranged between light-transmissive members, and wherein said two polarization conversion element arrays are separated by a predetermined space with no elements disposed between the two polarization conversion element arrays, said polarization separating surfaces of one of said two polarization conversion element arrays are arranged opposite to said polarization separating surfaces of the other of said two polarization conversion element arrays with respect to the predetermined space.]

[17. A projection display apparatus according to claim 16, further comprising a dummy region including neither said polarization separating surfaces nor said reflecting surfaces, said dummy region being made of a transmissive material and disposed on an end at a predetermined space side of each of said two polarization conversion element arrays.]

[18. A projection display apparatus according to claim 17, wherein a corner at the predetermined space side of said dummy region is removed.]

[19. A projection display apparatus according to claim 16, further comprising a region including neither said polarization separating surfaces nor said reflecting surfaces, said region being made of a transmissive material and disposed on an end opposite to a predetermined space side of each of said two polarization conversion element arrays.]

[20. A projection display apparatus according to claim 16, wherein said polarization separating surfaces are arranged in accordance with a distribution of light leaving said lens array.]

[21. A projection display apparatus according to claim 16, further comprising a polarization separating surface disposed at a location device closest to the predetermined space between said two polarization conversion element arrays, such that a center of said closest polarization separating surface is disposed closer towards the predetermined space than a center axis of a lens among said plurality of lenses of said lens array which is disposed closest to said closest polarization separating surfaces.]

[22. A projection display apparatus according to claim 16, wherein said polarization separating surfaces and said reflecting surfaces along the light-incoming surface of each of said polarization conversion element arrays are arranged along a direction of arrangement at a pitch that is greater than ½ an arrangement pitch of said lens array disposed along the direction of arrangement of said polarization separating surfaces and said reflecting surfaces.]

*23. An optical element for an optical system including complementary optical elements arranged on opposing sides of an optical axis, the optical element comprising:*

*a polarization separation element array including polarization separating surfaces for separating a light with random polarization directions into two types of linearly polarized light and reflecting surfaces for reflecting one of the two types of the linearly polarized light produced by separation by the polarization separating surfaces, the polarization separating surfaces and the reflecting surfaces being alternately arranged between light-transmissive members; and*

*a dummy region including neither the polarization separating surfaces nor the reflecting surfaces, the dummy region being made of a transmissive material and disposed on an end of the polarization separation element array to be arranged proximal the optical axis, a corner of the optical element in the dummy region being removed.*

*24. The optical element according to claim 23, further comprising a lens array affixed to one surface of the polarization separation element array.*

* * * * *